US006838525B2

(12) United States Patent
Pitchumani et al.

(10) Patent No.: US 6,838,525 B2
(45) Date of Patent: Jan. 4, 2005

(54) PROCESS FOR MANUFACTURE OF PROTON CONDUCTIVE POLYMER GEL USEFUL AS BACKFILL FOR SACRIFICIAL AND IMPRESSED CURRENT ANODE SYSTEMS

(75) Inventors: Sethuraman Pitchumani, Tamil Nadu (IN); Hirudayasamy Dolli, Tamil Nadu (IN); Nerur Sankaranarayanan Rengaswamy, Tamil Nabu (IN); Meenakshisundaram Raghavan, Tamil Nabu (IN)

(73) Assignee: Conceil of Scientific and Industrial Research, New Delhi (IN)

( * ) Notice: Subject to any disclaimer, the term of this patent is extended or adjusted under 35 U.S.C. 154(b) by 106 days.

(21) Appl. No.: 10/392,394

(22) Filed: Mar. 20, 2003

(65) Prior Publication Data

US 2004/0186221 A1 Sep. 23, 2004

(51) Int. Cl.$^7$ .............................................. C08F 120/06
(52) U.S. Cl. ................. 525/329.7; 525/329.4; 525/387
(58) Field of Search ........................... 525/329.7, 329.4, 525/387

(56) References Cited

U.S. PATENT DOCUMENTS 4,391,278 A * 7/1983 Cahalan et al. ............. 600/391
5,423,739 A  6/1995 Phipps et al.
5,650,060 A * 7/1997 Huang et al. ............... 205/730

FOREIGN PATENT DOCUMENTS

EP         0668373 A1    8/1995

* cited by examiner

Primary Examiner—Satya B. Sastri
(74) Attorney, Agent, or Firm—Nixon & Vanderhye P.C.

(57) ABSTRACT

The process of the present invention provides for the manufacture of a novel proton conductive polymer gel useful as backfill for sacrificial and impressed current anode systems. The process of the present invention is carried out in aqueous phase thus providing a cheaper option besides the use of ingredients readily available in the international markets. The polymer used as backfill is transformed into a proton conducting form in the gelated network through an in-situ doping process during gelation. The gel product produced can be sliced to sheet of any desired size suitable and compatible to concrete or soil medium. The novelty of the product of the present invention is that it can be used as backfill between any anode such as sacrificial or impressed current mode and is adaptable to the concrete surface both in the presence of moisture or absence of moisture, which is not hitherto been achieved in prior art. Further, the specialty of the utility of this product, is its compatibility with all the sacrificial anodes such Mg, Al, Zn which is not hitherto been realized with any of the earlier chemical backfill known for this application.

21 Claims, No Drawings

PROCESS FOR MANUFACTURE OF PROTON CONDUCTIVE POLYMER GEL USEFUL AS BACKFILL FOR SACRIFICIAL AND IMPRESSED CURRENT ANODE SYSTEMS

FIELD OF THE INVENTION

The present invention relates to a process for manufacture of a novel proton conductive polymer gel useful as backfill for sacrificial and impressed current anode systems.

BACKGROUND OF THE INVENTION

Efficient functioning of any anode in a cathodic protection system depends on the backfill material used at the interface between the anode and the electrolyte. Normally in the cathodic protection of underground structures and pipelines buried in soil, chemical backfills in powder form are used. However, this type of backfill is not suitable for use in concrete structures. Chemical backfills can be helpful in adsorbing/absorbing soil moisture to keep the environment immediately surrounding the anode continuously moist, thereby promoting better anode current efficiency.

In the case of impressed current anode systems, carbonaceous backfills are widely used. A conductive overlay based on coke breeze has been used for cathodic protection of reinforced concrete structures. More recently, hydrogel systems have been experimented. However an efficient ion conductive backfill, notably proton conducting backfill, in sheet form based on polymer has hitherto been unknown in the prior art.

Reference is made to 'Control of Pipeline Corrosion' edited by A. W. Peabody and published by National Association of Corrosion Engineers, USA, 1967, page No 107; where in use of carbonaceous backfill based on coal coke breeze, calcined petroleum coke breeze and natural or man made graphite backfills is mentioned. The major drawback is that this material is in powder form and must be tamped solidly around the anode. When the contact pressure cannot be made sufficiently solid initially, or relaxes with time, much of the current will discharge directly from anode to electrolyte, thereby reducing the anode life. Petroleum Coke must be calcined to remove all other petroleum products, otherwise its resistivity will be too high. On page 120 of the document, the composition of chemical backfills for galvanic anodes has been given. Anode resistivity very mush depends on the composition. A backfill composed of 75% hydrated graphite, 20% bentonite clay and 5% sodium sulphate is mentioned. The main drawback of this backfill is that being in powder form, it is rather difficult to prevent leaching in soil in spite of confining the backfill in a bag. Further such backfills cannot be retained easily on a concrete surface. Intimate contact cannot be ensured at all seasons particularly during summer.

Reference is made to Jack Bennett and Clim Fir Lotte, *Materials Performance* Volume 36 March 1997, pp 14–20; wherein adhesive type of acrylic hydrogel was evaluated for use in reinforced concrete structure. The main drawback of this hydrogel is that the gel must be prevented from direct contact with water or seawater by caulking the edge. This is not practicable. It is often difficult to prevent exchange of water with the environment. Their studies further reveal that the developed hydrogel system was best suited for use with pure zinc as sacrificial anode, and that hydrogel adhesives available for medical applications are not satisfactory for cathodic protection of reinforced concrete structures. Reference is also made to R. J. Kassler R. G. Powers and I. R. Lasa, *Materials Performance* Vol 37, January 1998, pp 12–16; wherein performance of zinc sheet anodes with another vinyl type sheet material with an adhesive compound on both sides is reported. The main draw back of this system is that there is wide variation in performance. Another limitation is that performance of this vinyl type, sheet material system was evaluated only on zinc sheet anode system.

Hydrogels hitherto used for cathodic protection of concrete structure involve the use of classical polymer gels mainly of simple vinyl system as backfiller whose inherent water contact in the gelated physico-chemical structure has provided necessary ionic conducting pathways in the electrochemical cell configuration providing the protective system. Further, this requires coverage on both sides to prevent transport of moisture laterally.

Literature search provides the references given above. No patent was located on the use of ion conducting polymer for use in cathodic protection of concrete structures.

OBJECT OF THE INVENTION

To overcome these major drawbacks there is a definite need for providing a novel backfill material. Particularly an efficient ion conductive backfill, notably proton conducting backfill, in sheet form based on polymer which is hitherto been unknown in the prior art.

Accordingly, the main object of the invention is to provide a process for manufacture of a novel proton conductive polymer gel useful as backfill for sacrificial and impressed current anode system, which obviates the drawbacks as detailed above.

Another object of the invention is to provide a novel proton conductive polymer backfill in sheet form, which can be conveniently inserted at anode/concrete interface.

Another object of this invention is to provide a novel backfill whose functioning will not be adversely affected by direct contact with moisture and whose efficiency will, on the other hand, increase in presence of moisture.

Yet another object of this invention is to provide a novel backfill system such that its functioning is independent of anode system.

SUMMARY OF THE INVENTION

The process of the present invention provides for the manufacture of a novel proton conductive polymer gel useful as backfill or sacrificial and impressed current anode systems. The process of the present invention is carried out in aqueous phase thereby providing a economical option by the use of ingredients readily available in the international markets. The polymer used as backfill is transformed into a proton conducting form in the gelated network through an in-situ doping process during gelation. The gel product produced can be sliced to sheet of any desired size suitable and compatible to concrete or soil medium. The novelty in the product of the present invention is that it can be used as backfill between any anode, such as sacrificial or impressed current anode, and is adaptable to a concrete surface, both in presence or absence of moisture, which is not hitherto been achieved in prior art. Further, the specialty of the utility of this product, is its compatibility with all the sacrificial anodes such Mg, Al, Zn which is not hitherto been realized with any of the earlier chemical backfill known for this application.

Accordingly, the present invention provides a process for manufacture of a novel proton conductive polymer gel useful as backfill for sacrificial and impressed current anode systems, which comprises preparing an aqueous solution consisting of a gel forming structure selected from the acrylic family of monomers, an amide or sulphonic acid group either alone or in combination and a gelating agent, adding to solution obtained stoichiometric amounts of a dopant, followed by adding an oxidizing agent, baking resultant reaction mixture, cooling and maintaining baked reaction mixture to obtain proton conductive polymer gel.

In one embodiment of the invention, the concentration of the gel forming structure in solution is in the range of 0.1 to 0.5 mole %, the concentration of the amide or sulphonic acid group either alone or in combination is in the range of 0.25 to 0.75 mole % with respect to monomer concentration and the concentration of the gelating agent is in the range of 0.1 to 0.5 mole % with respect to monomer concentration.

In another embodiment of the invention, the ratio of the dopant to the monomer is in the range of 1:1 to 2:1 and the oxidizing agent is added at the rate of 1 to 5 drops/minute.

In another embodiment of the invention, the dopant is a mineral acid.

In a further embodiment of the invention, the reaction mixture is baked at a temperature in the range of 75 to 80° C. and for a time period of 100 to 150 minutes and the temperature then reduced to a range of 60 to 65° C. and maintained for a period of 1 to 2 hour.

In a further embodiment of the invention, the proton conductive polymer gel obtained is washed one or more times with water and allowed to cool in air followed by drying.

In another embodiment of the invention the gel forming structure is selected from the group consisting of acrylic acid, methacrylic acid and derivatives thereof.

In another embodiment of the invention the gelating agent is selected from the group consisting of glutaldehyde, N-N methylene bisacrylamide and glycidyl methacrylate.

In yet another embodiment of the invention the dissolution in water is effected at a temperature in the range of 25 to 30° C. under magnetic stirring.

In still another embodiment of the invention the mineral acid added is selected from stoichiometric amounts of any one of $H_2SO_4$, HCl, $H_3PO_4$, and $HBF_4$ and is mixed for a period in the range of 30 to 60 minutes.

In another embodiment of the invention the oxidizing agent comprises $H_2O_2$ used as drops whose addition is regulated over a period of time in the range of 30–60 minutes.

In a further embodiment of the invention the proton conducting polymer gel is subjected to multiple washings with around 250 ml of water per gram of gel.

In a still further embodiment of the present invention the final polymer gel product obtained is a proton having conductivity of the order of $10^{-2}$–$10^{-3}$ S/cm.

DETAILED DESCRIPTION OF THE INVENTION

The present invention provides a process for the manufacture of a novel proton conductive polymer gel useful as backfill for sacrificial and impressed current anode systems, which is unknown in the hitherto known prior art. The process comprises preparing an aqueous solution of a gel forming structure, preferably from acrylic family of monomers, such as acrylic acid, methacrylic acid and derivatives thereof of concentration in the range of 0.1 to 0.5 mole %, with amide or sulfonic acid group either alone or in combination of concentration in the range of 0.25 to 0.75 mole % with respect to monomer concentration, and a gelating agent, such as glutaldehyde. N-N methylene bisacrylamide, glycidyl methacrylate, in the range of 0.1 to 0.5 mole % with respect to monomer concentration. All these components are dissolved at a dissolution temperature of 25 to 30° C. under magnetic stirring, followed by the addition of dopant in stoichiometry amounts of mineral acid such as $H_2SO_4$, HCl, $H_3PO_4$, $HBF_4$ and mixed for a period in the range of 30 to 60 minutes. The ratio of dopant:monomer being in the range of 1:1 to 2:1. Adding oxidizing agent such as $H_2O_2$ at a rate ranging from 1 to 5 drops per minute regulated over a period of time in the range of 30–60 minutes. The entire reaction mixture so obtained is placed in an oven for baking at a temperature in the range of 75 to 80° C. for a period of 100 to 150 minutes to initiate doping and simultaneous gelation. This is followed by reducing the temperature to 60 to 65° C., and maintaining for a period of 1 to 2 hours to obtain proton conductive polymer gel. Subjecting the gel so formed to multiple washing with around 250 ml of water per gram of gel and allowing the washed gel to cool in air, followed by drying. After drying the gel so formed can be sliced to sheet of any desired size for evaluation in concrete or soil medium structure.

The entire operation of the process of the present invention is carried out in aqueous phase thus providing an economical option besides the use of ingredients readily available in the international markets. Also the gel product produced can be sliced to sheet of any desired size suitable and compatible to concrete or soil medium. The novelty of the product of the present invention is that it can be used as backfill between any anode such as sacrificial or impressed current mode and is adaptable to the concrete surface both in the presence of moisture or absence of moisture, which is not hitherto been achieved in prior art. Moreover, the polymer used as backfill is transformed into a proton conducting form in the gelated network through an in-situ doping process during gelation specifically for the said application. Thus this product is specifically customized through this inventive process specific to the application mentioned namely concrete surface and the soil medium and the product is first of its kind in the application of cathodic protection of concrete surface. Further, the specialty of the utility of this product, its compatibility with all the sacrificial anodes such Mg, Al, Zn which is not hitherto been realized with any of the earlier chemical backfill known for this application.

The following examples are given by way of illustration and therefore should not be construed to limit the scope of the present invention.

EXAMPLE 1

Preparation of $HBF_4$ Doped Proton Conducting Poly (Acryl Amide-co-acrylic Acid) Gel as Chemical Backfill To a stoppered glass container containing 250 ml of water, a mixture acrylamide and acrylic acid (monomers) in the ratio of 1:1 (0.65 mole %) was added and dissolved. After this addition, a calculated quantity (0.1 mole %) of N-N methylene bisacrylamide was added. The ingredients were allowed to dissolve at room temperature of 30° C. and the dissolution was hastened by stirring. To the clear homogeneous solution so obtained, a dopant solution namely $HBF_4$ was added in a ratio 1.8:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all the additions, the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the gel was found to be $7.2 \times 10^{-2}$ S/cm.

EXAMPLE 2

Preparation of $H_2SO_4$ Doped Proton Conducting Poly (Acryl Amide-co-acrylic Acid) Gel as Chemical Backfill To a stoppered glass container containing 250 ml of water, a mixture acrylamide and acrylic acid (monomers) in the ratio of 1:1 (0.65 mole %) was added and dissolved. After this addition, a calculated quantity (0.1 mole %) of N-N methylene bis acrylamide was added. The ingredients were allowed to dissolve at room temperature of 30° C. and the dissolution was hastened by stirring. To the clear homogeneous solution so obtained, a dopant solution namely $H_2SO_4$ was added in a ratio 1.5:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all these additions the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the gel was found to be $5.5 \times 10^{-3}$ S/cm.

EXAMPLE 3

Preparation of HCl Doped Proton Conducting Poly (Acryl Amide-co-acrylic Acid) Gel as Chemical Backfill To a stoppered glass container containing 250 ml of water, a mixture acrylamide and acrylic acid (monomers) in the ratio of 1:1 (0.65 mole %) was added and dissolved. After this addition, a calculated quantity (0.1 mole %) of N-N methylene bis acrylamide was added. The ingredients were allowed to dissolve at room temperature of 30° C. and the dissolution was hastened by stirring. To the clear homogeneous solution so obtained, a dopant solution namely HCL was added in a ratio 1.7:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all these additions the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the gel was found to be $4.5 \times 10^{-3}$ S/cm.

EXAMPLE 4

Preparation of $H_3PO_4$ Doped Proton Conducting Poly (Acryl Amide-co-acrylic Acid) Gel as Chemical Backfill To a stoppered glass container containing 250 ml of water, a mixture acrylamide and acrylic acid (monomers) in the ratio of 1:1 (0.65 mole %) was added and dissolved. After this addition, a calculated quantity (0.1 mole %) of N-N methylene bis acrylamide was added. The ingredients were allowed to dissolve at room temperature of 30° C. and the dissolution was hastened by stirring. To the clear homogeneous solution so obtained, a dopant solution namely $H_3PO_4$ was added in a ratio 2:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all these additions the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the gel was found to be $2.5 \times 10^{-3}$ S/cm.

EXAMPLE 5

Preparation of Glycidyl Methacrylate Driven Proton Conducting Poly (Acryl Amide-co-methacrylic Acid) Gel as Chemical Backfill To a stoppered class container containing 250 ml of water, a mixture acrylamide and methacrylic acid (monomers) in the ratio of 1:1 (0.65 mole %) was added and dissolved. After this addition, 0.05 mole % glycidyl methacrylate was added. The ingredients were allowed to dissolve at room temperature of 30° C. and the dissolution was hastened by stirring. To the clear homogeneous solution so obtained, a dopant solution namely $HBF_4$ was added in a ratio 1.8:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all these additions the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the gel was found to be be $3.2 \times 10^{-3}$ S/cm

EXAMPLE 6

Preparation of Glutaldehyde Driver Poly (Acrylamide-co-acrylymide-3methyl Propone Sulfonic Acid) Gel as Chemical Backfill To a stoppered glass container containing 250 ml of water, a mixture acrylamide and 2-acrylamide-3 methyl 1-propane sulfonic acid in the ratio of 1:1 (0.5 mole %) was added and dissolved. After this addition, a 0.01 mole % of glutaldehyde was added. The ingredients were allowed to dissolve at room temperature of 30° C. and the dissolution was hastened by stirring. To the clear homogeneous solution so obtained, a dopant solution namely HCL was added in a ratio 1.7:1 with respect to monomer. The dopant mixing was effected at a temperature of 30° C. To this mixture, $H_2O_2$ was added at the rate of 2 drops per minute and the number of drops added were only 15 thereby allowing a mixing time of 30 minutes. After all these additions the entire concentrated reaction mixture was placed in an oven kept at 80° C. and allowed to bake for 120 minutes and thereafter equilibrated at 60° C. for 1½ hour. The final gel product was cooled in air and water washing was provided to the gel for 10 times, each with 250 ml of water per gram of the product formed. After drying, the gel was sliced to sheets of desired size for evaluation in concrete or soil medium. The ionic conductivity of the product 1 was found to be $4.5 \times 10^{-2}$ S/cm$^2$.

Performance of the novel ion conductive polymer backfill of the present invention was evaluated in soil as well as concrete medium. For comparison, performance of a commercially available hydrogel and that of a standard backfill consisting of gypsum, sodium sulphate and bentonite clay were evaluated. In these evaluation studies, three types of sacrificial anodes systems viz Mg, Al, and Zn were employed. For evaluation of impressed current anode system, titanium substrate insoluble anode was been employed. The experiments as carried out are detailed in the examples below.

EXAMPLE 7

Sustainability of Polarization Shift-evaluation in Sand Medium with Magnesium Anode Washed and dried river sand was mixed with distilled water containing 1500 ppm of chloride to make a workable mixture. This semi-solid mixture was packed tightly in a non-metallic container of size 20×20×10 cm. Two numbers of cold twisted mild steel reinforcement rods (8 mm dia and 10 cm long) were pickled and de-rusted in pickling acid, dried and degreased with trichloroethylene. Electrical leads were taken from one end. The reinforcement rods were embedded at a depth of 8 cm from the top surface. Horizontal spacing between the rods was maintained at 8 cm. Simultaneously an embeddable reference electrode was buried horizontally between the two rods. An inter-electrode spacing was maintained at 0.5 cm. Open circuit potential of steel was monitored over a period of 120 minutes. Subsequently a magnesium-based anode of size 5×3 cm was placed on the top surface. In one set of experiments, the newly developed iron conductive polymer backfill of size 50 mm dia and 3 mm thick was inserted at the interface between anode bottom and sand surface. The anode terminal was externally short circuited with rebar terminals. The potential of the re-bars got shifted in the cathodic direction and this polarized potential was monitored and recorded up to a period till there was a considerable decrease in the potential shift.

In another set of experiments, 5 gms of commercially available hydrogel was applied at the inter face between the anode bottom and the sand surface and the potential shift was monitored till there was a considerable decrease in potential shift. In yet another set of experiments, the standard backfill consisting of 5 gms of mixtures of bentonite clay (20%) gypsum (75%) and sodium sulfate (5%) was applied at the interface and the shift in potential monitored till there was a considerable decrease in potential. The results are given in table 1.

TABLE 1

Comparative data on sustainability of maximum shift in potential in sand medium

| Sl. No | Type of Backfill | Maximum shift in potential (mV Vs NDE) | Sustainable time (days) |
|---|---|---|---|
| 1 | Ion conductive polymer | 439 | >45 |
| 2 | Chemical backfill | 413 | 15 |
| 3 | Hydrogel | 405 | 7–10 |

It can be seen from the above table that when compared to the commercially available chemical backfill and hydrogel system, the newly developed ion conductive polymer backfill is able to maintain a higher polarization shift for longer duration when tested with magnesium anode in sand medium containing 1500 ppm of chloride.

EXAMPLE 8

Sustainability of Polarization Shift-evaluation in Sand Medium with Zinc Anode

Washed and dried river sand was mixed with distilled water containing 1500 ppm of chloride so as to make a workable mixture. This semi-solid mixture was packed tightly in a non-metallic container of size 20×20×10 cm. Two numbers of cold twisted mild steel reinforcement rods (8 mm dia and 10 cm long) were pickled and de-rusted in a pickling acid dried and degreased with Trichloroethylene. Electrical leads were taken from one end. The reinforcement rods were embedded at a depth of 8 cm from the top surface. The horizontal spacing between the rods was maintained at 8 cm. Simultaneously an embeddable reference electrode was buried horizontally between the two rods. An inter electrode spacing was maintained at 0.5 cm. The open circuit potential of steel was monitored over a period of 120 minutes. Subsequently a zinc anode of size 5×3 cm was placed on the top surface. In one set of experiment, the newly developed iron conductive polymer backfill of size 50 mm dia and 3 mm thick was inserted at the inter face between the anode bottom and sand surface. The anode terminal was externally short circuited with rebar terminals. The potential of the re-bars got shifted in the cathodic direction and this polarized potential was monitored and recorded up to a period till there was a considerable decrease in the potential shift.

In another set of experiments, 5 gms of commercially available hydrogel was applied at the inter face between the anode bottom and the sand surface and the potential shift was monitored till there was a considerable decrease in potential shift. In yet another set of experiments, the standard backfill consisting of 5 gms of mixtures of bentonite clay (20%) gypsum (75%) and sodium sulfate (5%) was applied at the interface and the shift in potential monitored till there was a considerable decrease in potential. The results are given in table 2.

TABLE 2

Comparative data on sustainability of maximum shift in potential in sand medium

| Sl. No | Type of Backfill | Maximum shift in potential (mV Vs NDE) | Sustainable time (days) |
|---|---|---|---|
| 1 | Ion conductive polymer | 291 | >45 |
| 2 | Chemical backfill | 220 | 15 |
| 3 | Hydrogel | 138 | 10 |

It can be seen from the above table that when compared to the commercially available chemical backfill and hydrogel system, the newly developed ion conductive polymer backfill is able to maintain a higher polarization shift for longer duration when tested with zinc anode in sand medium containing 1500 ppm of chloride.

EXAMPLE 9

Sustainability of Polarization Shift-evaluation in Sand Medium with Aluminium Anode Washed and dried river sand was mixed with distilled water containing 1500 ppm of chloride so as to make a workable mixture. This semi-solid mixture was packed tightly in a non-metallic container of size 20×20×10 cm. Two numbers of cold twisted mild steel reinforcement rods (8 mm and 10 cm long) were pickled and de-rusted in a pickling acid, dried and degreased with Trichloroethylene. Electrical leads were taken from one end. The reinforcement rods were embedded at a depth of 8 cm from the top surface. The horizontal spacing between the rods was maintained at 8 cm. Simultaneously an embeddable reference electrode was buried horizontally between the two rods. An inter electrode spacing was maintained at 0.5 cm. The open circuit potential of steel was monitored over a period of 120 minutes. Subsequently a aluminium anode of size 5×3 cm was placed on the top surface. In one set of experiment, the newly developed iron conductive polymer backfill of size 50 mm dia and 3 mm thick was inserted at the inter face between the anode bottom and sand surface. The anode terminal was externally short circuited with rebar terminals. The potential of the re-bars got shifted in the cathodic direction and this polarized potential was monitored and recorded up to a period till there was a considerable decrease in the potential shift.

In another set of experiments, 5 gms of commercially available hydrogel was applied at the inter face between the anode bottom and the sand surface and the potential shift was monitored till there was a considerable decrease in potential shift. In yet another set of experiments, the standard backfill consisting of 5 gms of mixtures of bentonite clay (20%) gypsum (75%) and sodium sulfate (5%) was applied at the interface and the shift in potential monitored till there was a considerable decrease in potential. The results are given in table 3.

TABLE 3

Comparative data on sustainability of maximum shift in potential in sand medium

| Sl. No | Type of Backfill | Maximum shift in potential (mV Vs NDE) | Sustainable time (days) |
|---|---|---|---|
| 1 | Ion conductive polymer | 245 | >45 |
| 2 | Chemical backfill | 106 | 15 |
| 3 | Hydrogel | 47 | 10 |

It can be seen from the above table that when compared to the commercially available chemical backfill and hydrogel system the newly developed ion conductive polymer backfill is able to maintain a higher polarization shift for longer duration when tested with aluminium anode in sand medium containing 1500 ppm of chloride.

EXAMPLE 10

Sustainability of Polarization Shift-tests in Concrete Medium with Magnesium Anode A rectangular concrete prism of size 20×20×10 cm was cast with a de-rusted and degreased mild steel reinforcements of size 8 mm dia, 10.5 cm long embedded with a clear cover of 6 cm from the top surface. Electrical lead was taken from one end of the same reinforcement before embedment. A saturated calomel electrode was surface mounted to monitor the potential.

The open circuit potential of the embedded steel re-bars was monitored over a period of 60 minutes, subsequently a magnesium based anode of size 5 cm×3 cm was placed on the top surface. In one set of experiments, the newly developed iron conductive polymer was placed at the interface between the anode bottom and concrete surface The anode terminal was externally short circuited with the cathode terminals. The potential of rebars got shifted in the cathodic direction and this polarized potential was monitored and recorded upto a period till there was a considerable decrease in potential shift.

In another set of experiment, 5 gm of commercially available hydrogel was applied at the interface between the anode bottom and the concrete surface and the potential shift was monitored till there was a gradual decrease in potential shift. In yet another set of experiments the standard backfill consisting 5 gm of mixtures of sodium sulfate (70%), gypsum (25%) and bentonite Clay (5%) was applied at the interface and the shift in potential was monitored till there was a considerable decrease in potential. The results are given in table 4.

TABLE 4

Comparative data on sustainability of maximum shift in potential in concrete medium.

| Sl. No | Type of Backfill | Maximum shift in potential (mV Vs NDE) | Sustainable time (days) |
|---|---|---|---|
| 1 | Ion conductive polymer | 452 | >75 |
| 2 | Chemical backfill | 421 | 15 |
| 3 | Hydrogel | 405 | 7 |

It can be seen from the above table that when compared to the commercially available chemical backfill and hydrogel system, the newly developed ion conductive polymer backfill is able to maintain a higher polarization shift for longer duration when tested with magnesium anode in concrete medium containing 50 ppm of chloride.

EXAMPLE 11

Sustainability of Polarization Shift-Tests in Concrete Medium with Zinc Anode

A rectangular concrete prism of size 20×10×10 cm was cast with a de-rusted and degreased mild steel reinforcements of size 8 mm dia, 10.5 cm long embedded with a clear cover of 6 cm from the top surface. Electrical lead was taken from one end of the same reinforcement before embedment. A saturated calomel electrode was surface mounted to monitor the potential.

The open circuit potential of the embedded steel re-bars was monitored over a period of 60 minutes, subsequently a zinc anode of size 5 cm×3 cm was placed on the top surface. In one set of experiments, the newly developed ion conductive polymer was placed at the interface between the anode bottom and concrete surface. The anode terminal was externally short circuited with the cathode terminals. The potential of re-bars got shifted in the cathodic direction and this polarized potential was monitored and recorded upto a period till there was a considerable decrease in potential shift.

In another set of experiment, 5 gm of commercially available hydrogel was applied at the interface between the anode bottom and the concrete surface and the potential shift was monitored till there was a gradual decrease in potential shift. In yet another set of experiments the standard backfill consisting 5 gm of mixtures of sodium sulfate (70%), gypsum (25%) and bentonite Clay (5%) was applied at the interface and the shift in potential was monitored till there was a considerable decrease in potential. The results are given in table 5.

TABLE 5

Comparative data on sustainability of polarization shift-tests in concrete medium with zinc anode.

| Sl. No | Type of Backfill | Maximum shift in potential (mV Vs NDE) | Sustainable time (days) |
|---|---|---|---|
| 1 | Ion conductive polymer | 295 | >75 |
| 2 | Chemical backfill | 144 | 15 |
| 3 | Hydrogel | 267 | 7 |

It can be seen from the above table that when compared to the commercially available chemical backfill and hydrogel system, the newly developed ion conductive polymer backfill is able to maintain a higher polarization shift for longer duration when tested with zinc in concrete medium containing 50 ppm of chloride.

EXAMPLE 12

Sustainability of Polarization Shift—Impressed Current System—Tests in Concrete Medium Sustainability of polarization shift based on impressed current system was evaluated by using VOLTA LAB PGP 707 Galvanostat/Potentiostat instrument. A rectangular concrete prism of size 20×10×10 cm was cast with a de-rusted and degreased mild steel reinforcement of size 8 mm dia. 10.5 cm long embedded with a clear cover of 6 cm from the top surface. Electrical lead was taken from one end of the same reinforcement before embedment. A hydroxyl ion reversible electrode was embedded along with steel rebar The open circuit potential of the embedded steel rebar was monitored over a period of 60 minutes, subsequently a Titanium based mesh anode of size 3 cm×2 cm was placed on the top surface. In one set of experiments, the newly developed iron conductive polymer was placed at the interface between the anode bottom and concrete surface and retained under pressure for a period of 10 days. At the end of 10 days the anode terminal was externally short circuited with the cathode terminals, known amount of D.C current in cathodic direction was impressed though the system. The potential of embedded steel rebar gradually got stabilized after certain time. Stabilized shift in potential from the open circuit potential was noted the experiment was continued by increasing the current by another order of magnitude.

In another set of experiments 5 gms of a standard chemical backfill composed of sodium sulfate (70%), gypsum (25%) and bentonite Clay (5%) was placed at the interface between the anode bottom and concrete surface and retained under pressure for a period of 10 days. The results are given in table 6.

TABLE 6

| | | Shift in potential (mV) | |
|---|---|---|---|
| Sl. No | Impressed current mA/m$^2$ | Ion conductive polymer Backfill | Standard chemical Backfill |
| 1 | 1 | 95 ± 5 | 62 ± 5 |
| 2 | 10 | 129 ± 5 | 82 ± 5 |
| 3 | 100 | 262 ± 5 | 152 ± 5 |

It can be seen from the above table that when compared to the commercially available chemical backfill, the newly developed ion conductive polymer backfill of the present invention is able to maintain a higher polarization shift when tested with impressed current system using titanium anode (TSIA) in concrete medium containing 50 ppm of chloride. The main advantages of the present invention are:

1. The proton conducting polymer gel as backfill is specifically designed to concrete surface and soil medium.
2. The proton conducting property of polymer backfill is imparted in in-situ process.
3. The product can be sliced to sheet of any size and dimension.
4. The product can be used both with sacrificial anodes of all types such as Mg, Al and Zn and impressed current anode system.
5. The product can be used with concrete surface both in the presence or absence of moisture.

We claim:

1. A process for manufacture of a novel proton conductive polymer gel useful as backfill for sacrificial and impressed current anode systems, which comprises preparing an aqueous solution consisting of a gel forming structure selected from the acrylic family of monomers, an amide or sulphonic acid group either alone or in combination and a gelating agent, adding to solution obtained stoichiometric amounts of a dopant, followed by adding an oxidizing agent, baking resultant reaction mixture, cooling and maintaining baked reaction mixture to obtain proton conductive polymer gel.

2. A process as claimed in claim 1 wherein the concentration of the gel forming structure in solution is in the range of 0.1 to 0.5 mole %, the concentration of the amide or sulphonic acid group either alone or in combination is in the range of 0.25 to 0.75 mole % with respect to monomer concentration and the concentration of the gelating agent is in the range of 0.1 to 0.5 mole % with respect to monomer concentration.

3. A process as claimed in claim 1 wherein the ratio of the dopant to the monomer is in the range of 1:1 to 2:1 and the oxidizing agent is added at the rate of 1 to 5 drops/minute.

4. A process as claimed in claim 1 wherein the dopant is a mineral acid.

5. A process as claimed in claim 1 wherein the reaction mixture is baked at a temperature in the range of 75 to 80° C. and for a time period of 100 to 150 minutes and the temperature then reduced to a range of 60 to 65° C. and maintained for a period of 1 to 2 hour.

6. A process as claimed in claim 1 wherein the proton conductive polymer gel obtained is washed one or more times with water and allowed to cool in air followed by drying.

7. A process as claimed in claim 1 wherein the gel forming structure is selected from the group consisting of acrylic acid, methacrylic acid and derivatives thereof.

8. A process as claimed in claim 1 wherein the gelating agent is selected from the group consisting of glutaldehyde, N-N methylene bisacrylamide and glycidyl methacrylate.

9. A process as claimed in claim 1 wherein the dissolution in water is effected at a temperature in the range of 25 to 30° C. under magnetic stirring.

10. A process as claimed in claim 4 wherein the mineral acid added is selected from stoichiometric amounts of any one of $H_2SO_4$, HCl, $H_3PO_4$, and $HBF_4$ and is mixed for a period in the range of 30 to 60 minutes.

11. A process as claimed in claim 1 wherein the oxidizing agent comprises $H_2O_2$ used as drops whose addition is regulated over a period of time in the range of 30–60 minutes.

12. A process as claimed in claim 1 wherein the proton conducting polymer gel is subjected to multiple washings with around 250 ml of water per gram of gel.

13. A process as claimed in claim 1 wherein the final polymer gel product obtained is a proton conducting polymer gel having conductivity of the order of $10^{-2}$–$10^{-3}$ S/cm.

14. A process for the manufacture of a novel proton conductive polymer gel useful as backfill for sacrificial and impressed current anode systems, which comprises preparing an aqueous solution consisting of a gel forming structure selected from the acrylic family of monomers in a concentration in the range of 0.1 to 0.5 mole %, an amide or sulphonic acid group either alone or in combination in the range of 0.25 to 0.75 mole % with respect to monomer concentration and a gelating agent in the range of 0.1 to 0.5 mole % with respect to monomer concentration, adding to the solution so obtained stoichiometry amounts of dopant comprising a mineral acid in a ratio of dopant:monomer in the range of 1:1 to 2:1, followed by adding an oxidizing agent at 1 to 5 drops/minute, baking the resultant reaction mixture at a temperature in the rage of 75 to 80° C. for a period of 100 to 150 minutes, reducing the temperature to 60 to 65° C. and maintaining for a period of 1 to 2 hour to obtain proton conductive polymer gel, subjecting the gel so formed to multiple washings with water and allowing the washed gel to cool in air, followed by drying.

15. A process as claimed in claim 14 wherein the gel forming structure is selected from the group consisting of acrylic acid, methacrylic acid and derivates thereof.

16. A process as claimed in claim 14 wherein the gelating agent is selected from the group consisting of glutaldehyde, N-N methyleng bisacrylamide and glycidyl methacrylate.

17. A process as claimed in claim 14 wherein the dissolution in water is effected at a temperature in the range of 25 to 30° C. under magnetic stirring.

18. A process as claimed in claim 14 wherein the stoichiometry amounts of mineral acid selected from the group consisting of $H_2SO_4$, HCl, $H_3PO_4$, and $HBF_4$ is added and mixed for a period in the range of 30 to 60 minutes.

19. A process as claimed in claim 14 wherein the oxidizing agent is $H_2O_2$ and is used as drops with addition thereof being regulated over a time period in the range of 30–60 minutes.

20. A process as claimed in claim 14 wherein the proton conductive polymer gel obtained is subjected to multiple washings with around 250 ml of water per gram of gel.

21. A process as claimed in claim 14 wherein the final polymer gel product obtained is a proton conducting polymer gel having conductivity of the order of $10^{-2}$–$10^{-3}$ S/cm.

* * * * *